United States Patent Office 3,165,872
Patented Jan. 19, 1965

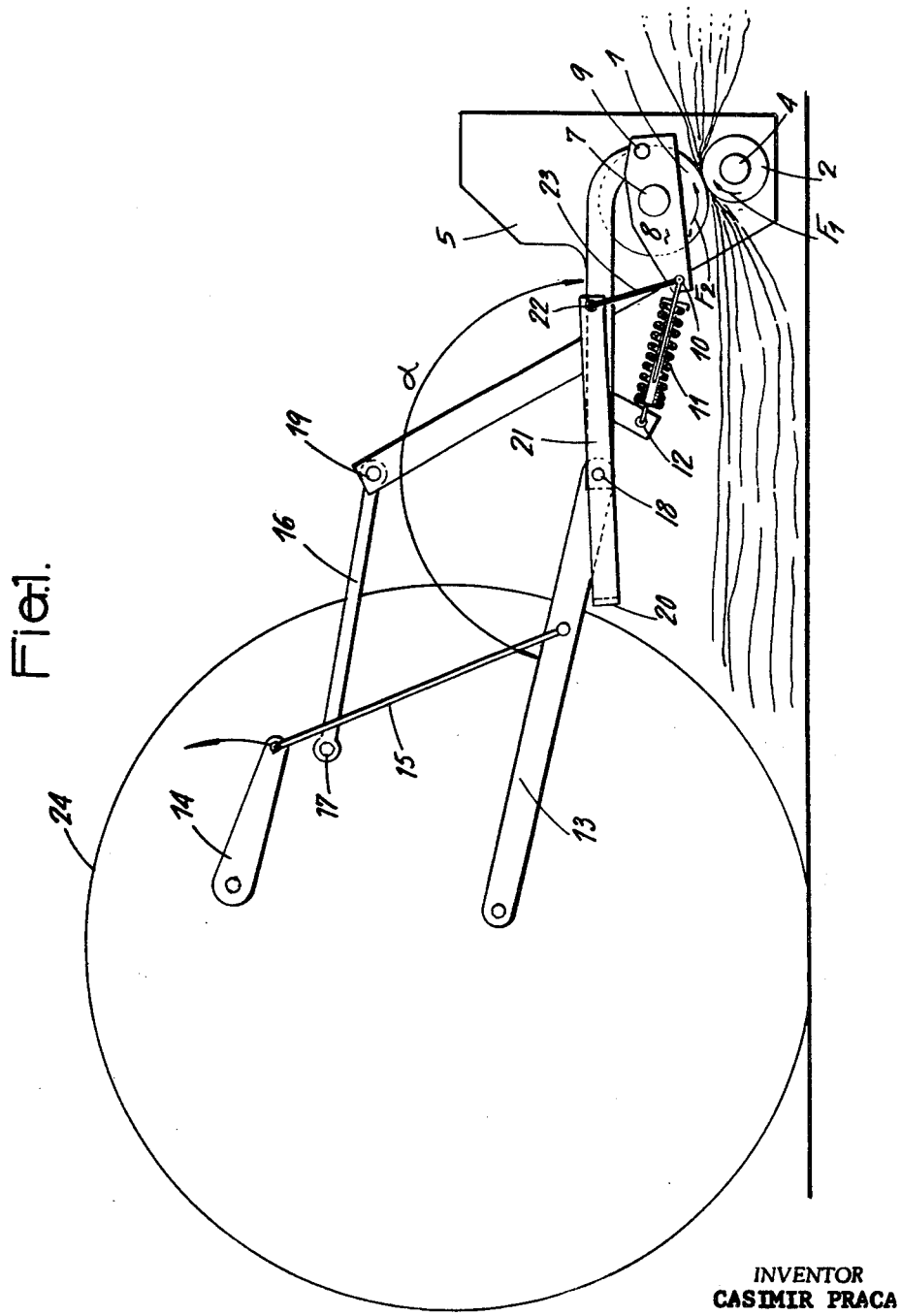

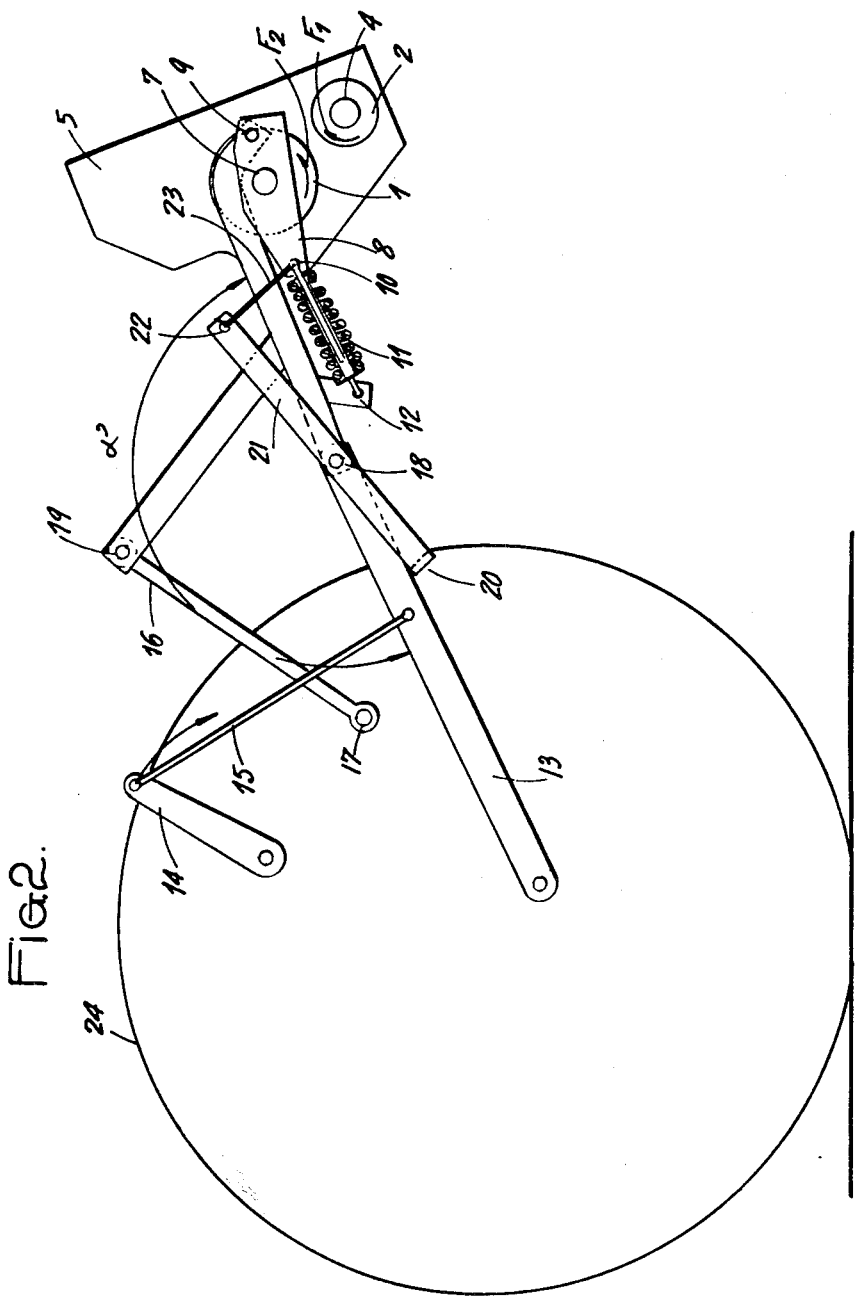

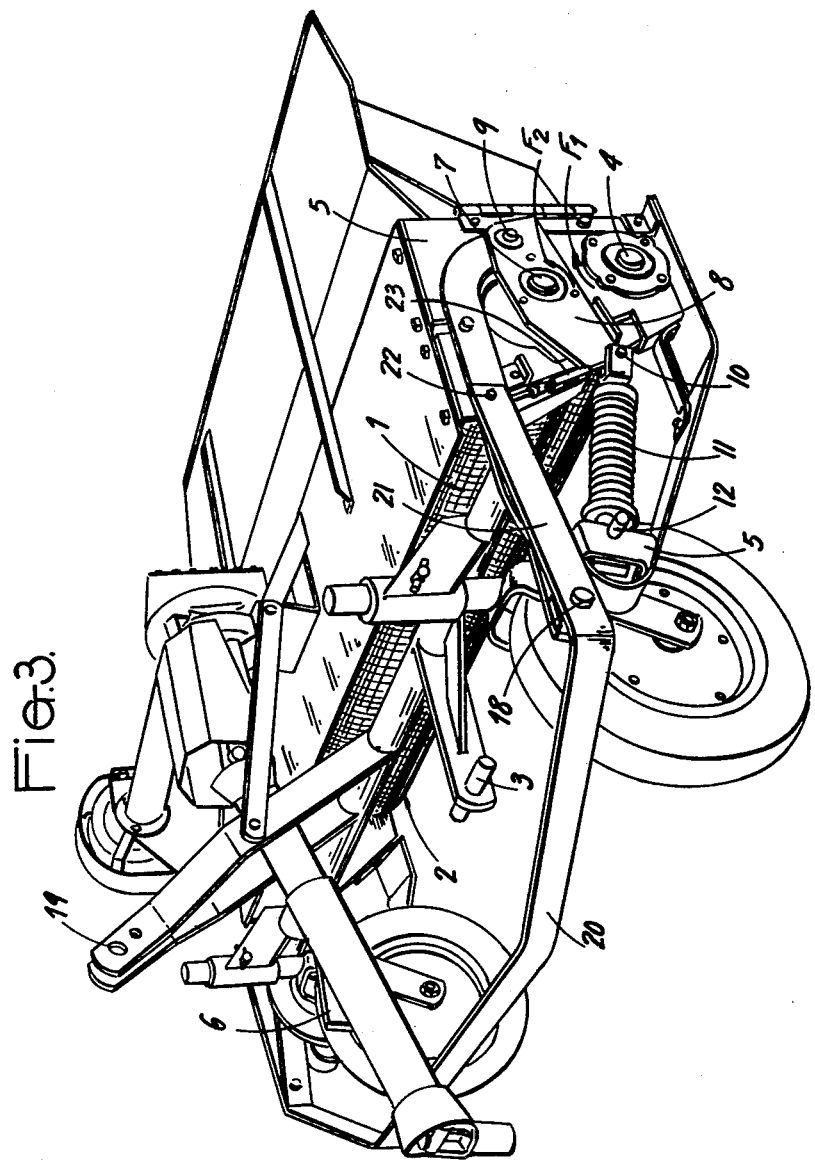

3,165,872
HAY CONDITIONER SUPPORTING AND
OPERATING MEANS
Casimir Praca, Fiers-par-Lille, Nord, France, assignor to
International Harvester Company, Chicago, Ill., a corporation of New Jersey
Filed Feb. 26, 1963, Ser. No. 261,088
4 Claims. (Cl. 56—1)

The present invention relates to a means for spacing the rollers of an agricultural implement, and in particular to a hay conditioner.

Devices adapted to space apart rollers of agricultural implements are already known.

In particular there exist devices applied to rollers for conditioning hay, wherein the lower roller can be rocked rearwards and upwards to roll over an obstacle, so that the impact with such an obstacle does not damage the machine.

There are also known devices for bringing close to each other the cylinders of hay conditioners, when the machine is in operative position, and for automatically spacing such cylinders apart when the machine is raised to its transport position.

The object of the present invention is to effect a momentary spreading of the rollers of a hay conditioner, when these rollers are choked by an excess of material, so as to enable them to resume their rotation instantaneously, since the material is no longer compressed therebetween.

More specifically, the present invention relates to a method for spacing apart the rollers of a hay conditioner, mounted on the three-point linkage of a tractor, said method, which is carried out whenever the rollers are choked by an excess of material, essentially consisting in raising the whole conditioner by means of hydraulic lifting arms of the tractor, and causing the lower lifting arms of said tractor to be abutted by operating linkage forming a part of the conditioner which moves the upper roller away from the lower roller so both rollers can immediately resume their rotation and where both rollers are returned to their original positions by lowering the conditioner.

The invention further relates to a device for spacing apart the upper and lower rollers of a hay conditioner mounted on the three-point linkage of a tractor, said device being essentially characterized in that the lower roller is fixed for rotation about an axis integral with the frame of the device; in that its upper roller is rotated on a shaft secured at each end to an arm having one end pivoted on a spindle integral with the frame and the other end of which is operated by a compression spring secured to the frame and exerting a continuous bias to urge the upper roller toward the lower roller to crush the material to be processed and wherein the arms are each secured to a linkage connected to a rocking lever pivoted on the frame, the arrangement being such that upon the rollers being choked, the entire hay conditioner is adapted to be raised by the operator by means of the hydraulic arms of the tractor, whereupon the forward end of the rocking lever is caused to abut at least one of the two lower lifting arms of the tractor, thereby rocking the lever and swinging the upper roller mounting arms upwardly whereby separating the upper roller from the lower roller against the action of both compression springs, and the reversed or lowering motion of the hay conditioner causing the rollers to resume their initial positions so that said rollers are again pressed against or urged toward each other by the bias of the compression springs.

Further features and advantages of the present invention will become clear from the following description, in connection with the accompanying drawings given merely by way of explanation and without limiting the invention to any one possible embodiment of the device according to the invention.

In these drawings:

FIGURES 1 and 2 are side-elevational diagrammatic views of the device according to the invention together with the hydraulic lifting device of the tractor, of which FIGURE 1 represents the hay conditioner in its lower position at which its two rollers are in mutual engagement, and FIGURE 2 represents the same conditioner in its upper position, at which its two rollers are spaced apart.

For clearness sake, the wheels of the conditioner which appear in FIGURE 3 have been omitted in FIGURES 1 and 2.

FIGURE 3 is a perspective view of the hay conditioner, the tractor being omitted.

The material to be split or conditioned is passed between two rollers 1 and 2. The lower roller 2 is rotated, in the direction of arrow $F_1$, about an axle secured to the frame body 5.

The upper roller 1 is rotated, in the direction of arrow $F_2$, about an axle 7 secured at both ends on an arm 8 (only one arm 8 can be seen in the figures).

Each of these two arms 8 is pivoted by one end on a pin 9 integral with the frame 5. A compression spring 11 secured to or reacting against the frame 5 at a point 12 exerts a continuous push on the other end 10 of the respective arm 8, so that the upper roller 1 presses or is urged against the lower roller 2 to crush the material to be processed.

The device according to the invention operates as follows:

When the rollers tend to choke, the entire implement is raised by means of the hydraulic lifting arms of the tractor, viz. the lower draft arms 13, the lifting arm 14, connecting link 15, upper arm 16 pivoted at 17, lower pivots 3 and 6 and upper pivot 19 for the machine (the points 3, 6 and 19 embody the three-point linkage). The reference 24 indicates one of the tractor's wheels.

By lifting the conditioner, the angle $\alpha$ formed by each of the two lower lifting arms 13 and the frame arm 5 increases (FIGURE 2, $\alpha'$).

The forward end portion 20 of each rocking lever 21, pivoted on a spindle 18, abuts or has a reactive engagement with the arms 13 at a certain stage of the lifting motion.

Accordingly, the lever 21 is rotated counterclockwise (according to the figures) and each of the two rear ends 22 thereof is moved away from the frame arm 5 lifting therewith through the corresponding linkage 23 the end 10 of arm 8, thereby spacing the upper roller 1 from the lower roller 2.

The rollers 1 and 2 being thus spaced apart, nothing prevents them from resuming their rotation under the action of the rear power take-off of the tractor.

Under the reverse movement of the implement, the rollers are once again engaged due to the bias of springs 11 and normal operation can be resumed.

What is claimed is:

1. A combination with a tractor having a draft arm pivotally mounted thereto for vertical swinging movement, a hay conditioning device comprising a frame, a pair of hay conditioning rolls supported on the frame, a pivot connection between said frame with said arm for jack-knifing action, and operating linkage interconnecting said arm and said rolls, said linkage comprising lever means pivoted to the connection between said frame and said draft arm and having one end reactably engaging said draft arm and having another end operatively connected to said linkage for automatically moving said rolls toward each other attendant to lowering of said device through downward swinging movement of the arm and separating the rolls when the device is elevated.

2. The combination with a three-point hitch having an upper link and a pair of rearwardly extending vertical swingable draft arms, a hay conditioning device comprising a frame pivotally connected to said draft arms for swinging movement about a substantially horizontal transverse axis, means connecting said frame with said link for controlling the attitude of said device with respect to the ground, said device comprising a pair of hay conditioning rolls, means rotatably and cooperatively supporting the rolls on said frame transversely of the direction of movement of the device and developing a forwardly open bite and said yieldable means retaining said rolls in said cooperative relation and said rolls movable vertically relative to each other for opening and closing said bite, and means including linkage operatively interconnecting said rolls with said arms and comprising lever means pivotally mounted on the frame and reactively cooperable with said draft arms for coincidentally opening the rolls upon elevation of the device by said arms and closing the rolls upon lowering of the device by said arms.

3. A crop pick-up and conditioning device comprising a frame, a pair of superposed crushing rolls carried on the frame transversely of the direction of movement of the device and forming a forwardly open bite, one of said rolls movable with respect to the other to open and close the bite, hitch means carrying said device, and means operatively interconnecting said hitch means with said movable roll comprising a spring actuated toggle linkage operative between the frame and movable roll, and toggle release means connected between said linkage and said hitch means and comprising lever means pivoted intermediate its ends on said frame and having one end abutting said hitch means and another end connected to said toggle linkage.

4. The combination with tractor mounted draft means including rearwardly extending draft arm means swingable vertically for elevating and lowering an associated implement, a hay conditioning device having a frame pivotally mounted on said draft arms for jack-knifing movement with respect thereto, tractor mounted link means connected to said frame for controlling its disposition with respect to said arm means, said device including a pair of hay conditioning rolls cooperatively arranged and relatively movable to close and open the spacing therebetween, and means including a lever pivotally mounted at the connection between said frame and said arm means and having one end underposed with respect to said arm means and having another end adjacent to said rolls, and means comprising a yieldable element operatively interconnecting said other end of said lever with at least one of said rolls for moving the same toward and away with respect to the other roll upon and coincidental with lowering and elevation of said device through said draft means.

References Cited in the file of this patent

UNITED STATES PATENTS

| | | |
|---|---|---|
| 2,415,156 | Arps | Feb. 4, 1947 |
| 2,712,358 | Kuhary et al. | July 5, 1955 |
| 2,932,143 | Morkoski | Apr. 12, 1960 |
| 2,989,829 | Heth et al. | June 27, 1961 |
| 3,039,256 | Witt | June 19, 1962 |